United States Patent
Do Van

(10) Patent No.: US 9,278,641 B2
(45) Date of Patent: Mar. 8, 2016

(54) VALVE FOR RAPID INFLATION AND DEFLATION

(71) Applicant: Hai Van Do Van, Hanoi (VN)

(72) Inventor: Hai Van Do Van, Hanoi (VN)

( * ) Notice: Subject to any disclaimer, the term of this patent is extended or adjusted under 35 U.S.C. 154(b) by 51 days.

(21) Appl. No.: 13/999,140

(22) Filed: Jan. 21, 2014

(65) Prior Publication Data

US 2014/0202556 A1 Jul. 24, 2014

Related U.S. Application Data

(60) Provisional application No. 61/849,093, filed on Jan. 18, 2013.

(51) Int. Cl.
| | |
|---|---|
| F16K 15/20 | (2006.01) |
| B60P 7/06 | (2006.01) |
| B65D 81/05 | (2006.01) |
| F16K 15/02 | (2006.01) |
| A47C 27/08 | (2006.01) |

(52) U.S. Cl.
CPC .............. B60P 7/065 (2013.01); B65D 81/052 (2013.01); F16K 15/028 (2013.01); F16K 15/205 (2013.01); A47C 27/081 (2013.01); *Y10T 137/3584* (2015.04); *Y10T 137/36* (2015.04); *Y10T 137/7876* (2015.04); *Y10T 137/7937* (2015.04)

(58) Field of Classification Search
CPC .............. F16K 21/04; Y10T 137/7877; Y10T 137/7876
USPC ............ 137/223, 224, 522, 523, 540, 543.19; 5/706
See application file for complete search history.

(56) References Cited

U.S. PATENT DOCUMENTS

| | | | |
|---|---|---|---|
| 3,785,395 A | 1/1974 | Andreasson | |
| 3,808,981 A | 5/1974 | Shaw | |
| 4,015,622 A * | 4/1977 | Pagani | 137/223 |
| 4,478,587 A * | 10/1984 | Mackal | 441/41 |
| 4,927,397 A | 5/1990 | Yeager | |
| 5,111,838 A | 5/1992 | Langston | |
| 5,546,981 A * | 8/1996 | Li et al. | 137/493.3 |
| 5,941,272 A | 8/1999 | Feldman | |
| 6,089,251 A | 7/2000 | Pestel | |
| 6,550,086 B2 | 4/2003 | Boyd | |
| 6,929,021 B2 | 8/2005 | Cavenagh | |
| 6,971,406 B2 * | 12/2005 | Takahashi | 137/543.19 |
| 7,051,753 B1 * | 5/2006 | Caires et al. | 137/232 |
| D536,565 S | 2/2007 | Shinner et al. | |
| 7,401,619 B2 | 7/2008 | Song et al. | |
| 7,410,145 B1 | 8/2008 | Elze et al. | |
| 7,434,594 B1 * | 10/2008 | Robbins et al. | 137/223 |
| 8,181,664 B2 | 5/2012 | Tsai | |
| 2010/0043914 A1 | 2/2010 | Pansegrouw | |
| 2010/0154897 A1 * | 6/2010 | Wu | 137/223 |

* cited by examiner

*Primary Examiner* — R. K. Arundale
(74) *Attorney, Agent, or Firm* — David C. Purdue

(57) ABSTRACT

A valve for selectively sealing and unsealing an opening in a bladder is disclosed. The valve includes a flange for mounting the valve around the opening in the bladder, a valve seat supported on the flange, and an air passageway. A spring plate is supported on the flange and spaced from the valve seat. A floating valve disk is provided between the valve seat and the spring plate for movement towards and away from the valve seat to seal and unseal the opening in the bladder. A spring is provided to bias the floating valve disk towards the valve seat. Deflation lugs are provided to hold the floating valve disk away from the valve seat against the force of the spring. The floating valve disk is free to pivot but is prevented from pivoting to such an extent that movement of the floating valve disk is impeded as by binding.

18 Claims, 7 Drawing Sheets

VALVE FOR RAPID INFLATION AND DEFLATION

CROSS-REFERENCE TO RELATED APPLICATIONS

None.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

BACKGROUND OF THE INVENTION

1. Field of the Invention

This invention concerns the field of valves and, more specifically, valves that are useful in rapidly filling and deflating dunnage air bags.

2. Background of the Invention

In a prior art search directed to the subject invention, the following US Patents were noted: U.S. Pat. Nos. 8,181,664; 7,410,145; 7,401,619; 7,051,753; 6,929,021; 6,550,086; 6,089,251; 5,941,272; 5,111,838; 4,927,397; 3,308,981; 3,785,395; and D536,565. Published US Patent application no. 2010/0043914 was also noted.

BRIEF SUMMARY OF THE INVENTION

The present invention is a valve especially suited for rapidly inflating and deflating a bag such as a bag that might be used to cushion freight in transit, also known as a dunnage bag. The valve has a flange for mounting it on a dunnage bag, and an air inlet accessible from outside of the bag. The flange supports a valve seat which faces the inside of the bag and a floating valve disk that is biased by a spring, for example, towards the valve seat for sealing engagement therewith. When the valve disk engages the valve seat, the valve is in a closed condition. Air delivered under pressure to the air inlet acts on the valve disk to overcome the bias and unseat the valve disk thereby opening the valve. When the valve is opened this way, pressurized air moves through the inlet and through the open valve to the inside of the bag to fill it to a desired pressure. When the desired pressure is reached, the source of pressurized air is removed from the air inlet and the biased valve disk engages the valve seat closing the valve to impede the flow of air out of the bag through the air inlet. A cap may be applied to the air inlet to further impede the flow of air out of the bag.

The valve includes a spring plate which is releasably connected to and axially spaced from the flange. A spring or other resilient member positioned between the spring plate and the valve biases the valve disk away from the spring plate and towards the valve seat. In a preferred embodiment, the spring plate comprises axially extending members which frictionally engage axially extending members supported on the flange. These members may comprise posts and cooperating cylindrical members for receiving the posts and, in this case, it is preferred that the posts frictionally engage the inside wall of the cylindrical posts to releasably support the spring plate on the flange spaced axially a given distance therefrom.

In a preferred embodiment, the flange supports pegs which extend axially from the flange towards the spring plate. The pegs have support surfaces at their distal ends which are spaced axially from the spring plate. The valve disk may be provided with radially extending tabs which can engage the support surfaces on the pegs to hold the valve disk in an open position against the force of the spring to facilitate deflation of the bag. In order for the valve disk to be held in the open position, the valve disk is pushed towards the spring plate, against the force of the spring, until the axial position of the valve disk tabs is between the spring plate and the peg support surfaces. The valve disk is then rotated to position the valve disk tabs over the peg support surfaces so that, when the pushing force is released, the spring pushes the valve disk so that the tabs engage the peg support surfaces and the pegs prevent the valve disk from seating against the valve seat. Finger knobs are provided on the valve disk and they extend axially into the air inlet so that they may be engaged from outside of the bag. The finger knobs are configured and positioned to facilitate movement of the valve disk towards the spring plate and rotation of the valve disk so that the valve disk tabs engage the peg support surfaces. Using only his or her fingers, a person can open the valve from outside of the bag and rotate the valve disk so that the valve disk is held in the open position to facilitate deflation of the bag.

Accordingly, it is an object of the invention to provide a valve for inflating and deflating a bag.

It is another object of the invention to provide a valve with a minimum number of parts which can be assembled by hand to produce the valve.

It is another object of the invention to provide a valve with a valve disk which is biased towards a valve seat.

It is another object of the invention to provide a valve with a valve disk which is moved into an open position by air pressure when a filling nozzle delivers air under pressure into the valve air inlet.

It is another object of the invention to provide a valve with a valve disk that closes when air under pressure is not being delivered through the valve air inlet.

It is another object of the invention to provide a valve with a valve disk that can be manipulated by hand from outside of the air inlet to open the valve.

It is another object of the invention to provide a valve with a valve disk that can be manipulated by hand from outside of the air inlet to lock the valve in the open position.

These and many other objects and advantages of the invention will be understood by persons skilled in the art who study the following description and the accompanying drawings which, although thorough, are merely illustrative.

BRIEF DESCRIPTION OF THE DRAWING FIGURES

DETAILED DESCRIPTION OF THE INVENTION

Figure 1:
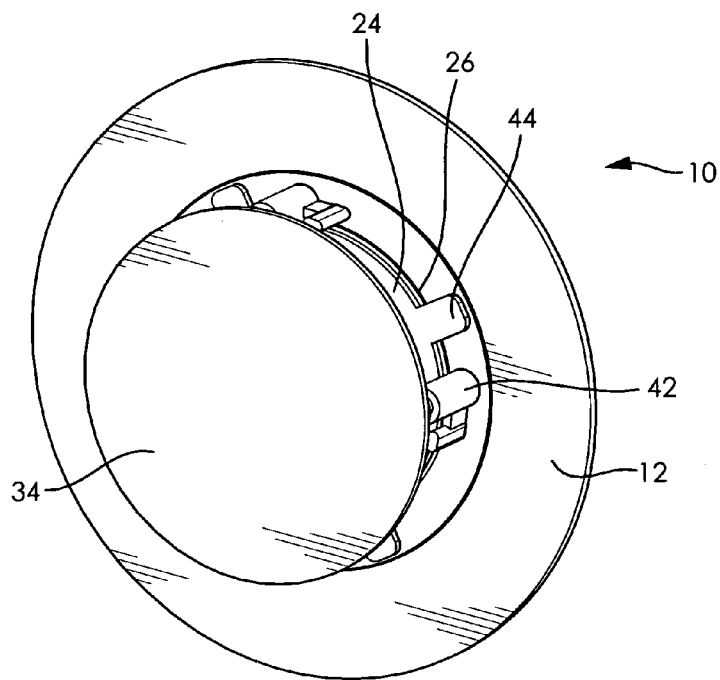
FIG. 1 is a perspective view of a first example of a valve according to the invention with the valve in a closed condition.

A valve according to a first embodiment of the invention is indicated generally at 10 in FIGS. 1 through 4 and 9. The valve 10 comprises a flange 12 for mounting it on a bag (not shown) or any other air bladder. Bag, as used herein, refers to a dunnage bag and to air bladders generally. An air inlet indicated at 14 is positioned generally outside of a bag when the flange 12 is secured to a side wall of the bag as by sonic welding, heat welding, chemical welding or other suitable means. The inlet 14 defines a passageway through which air can flow into, as well as out of, a bag through an opening in a wall of the bag. The air inlet 14 is defined by a generally cylindrically shaped inlet tube 16 which is supported on and extends outwardly from the flange 12. The inlet tube 16 has external threads which engage corresponding threads provided on the inside of a cap 18.

It is preferred that the inside wall of the inlet tube 16 taper, slightly, so that the inside diameter of the inlet tube 16 at its distal end 20 is slightly larger than the inside diameter of the inlet tube 16 at its proximal end 22 adjacent to the flange 12. With this configuration, a cylindrical filling tube (not shown) with a constant outside diameter is easily received in the inlet tube 16 if the outside diameter of the filling tube is slightly less than the inside diameter of the inlet tube 16 at the distal end 20. In this case, it is preferred that the inside diameter of the inlet tube 16 at the proximal end 22 be slightly smaller than the outside diameter of the filling tube so that the filling tube seats against the inside surface of the inlet tube 16 somewhere between the distal end 20 and the proximal end thereof.

Figure 2:
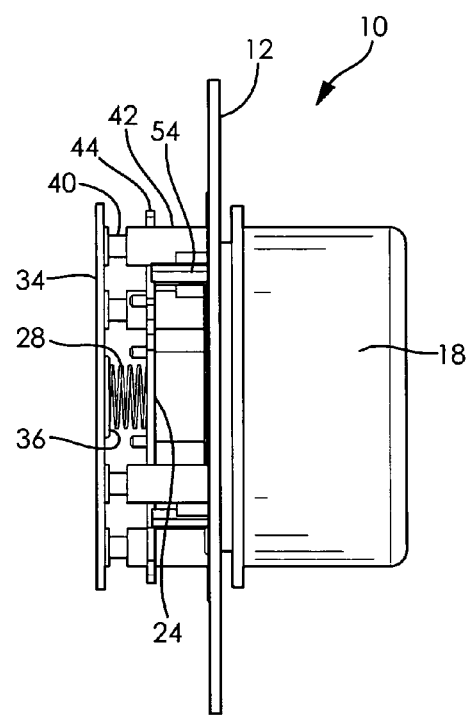
FIG. 2 is a side view of a valve according to the first example of the invention with a valve disk held in an open position against the force of a biasing spring.
Figure 3:
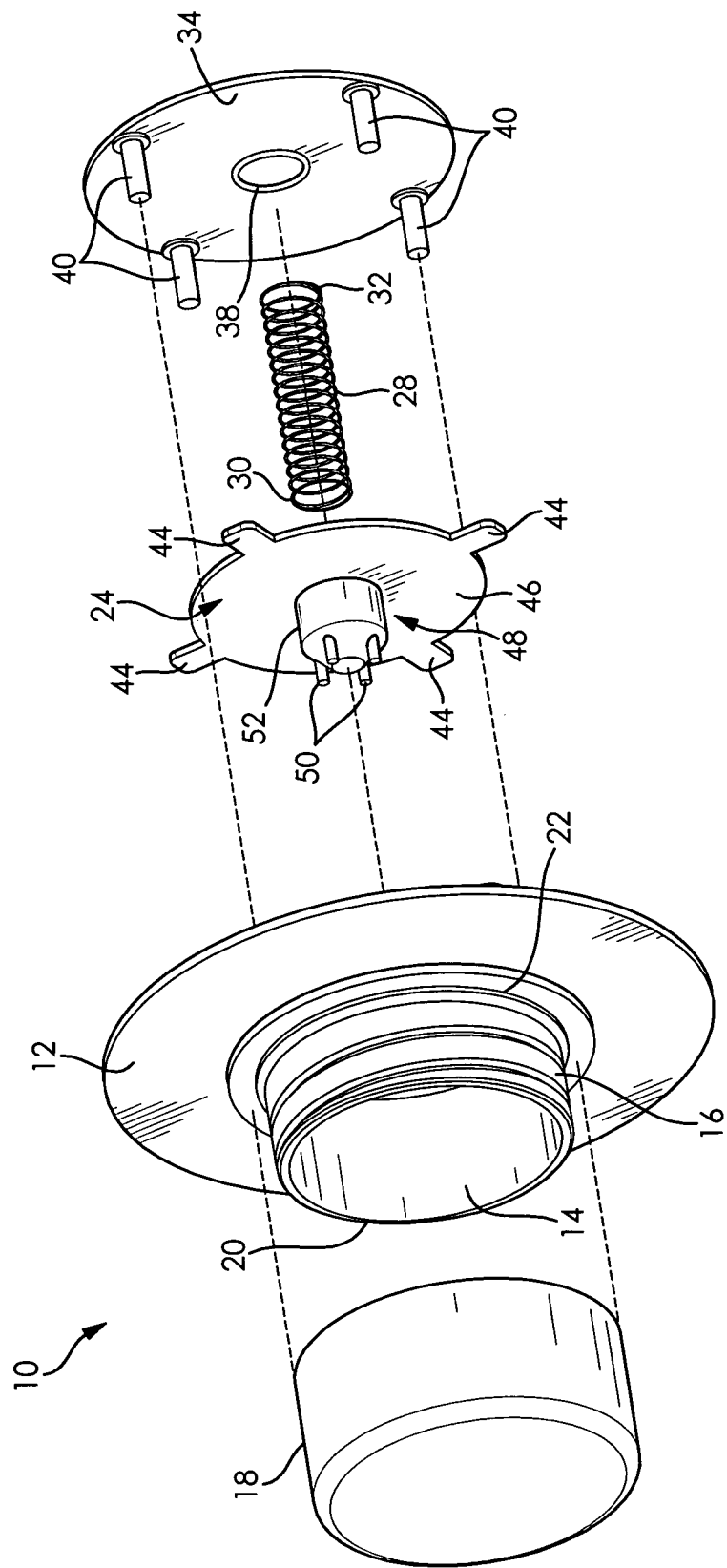
FIG. 3 is a perspective exploded view of a valve according to the first example of the invention from a first angle.
Figure 4:
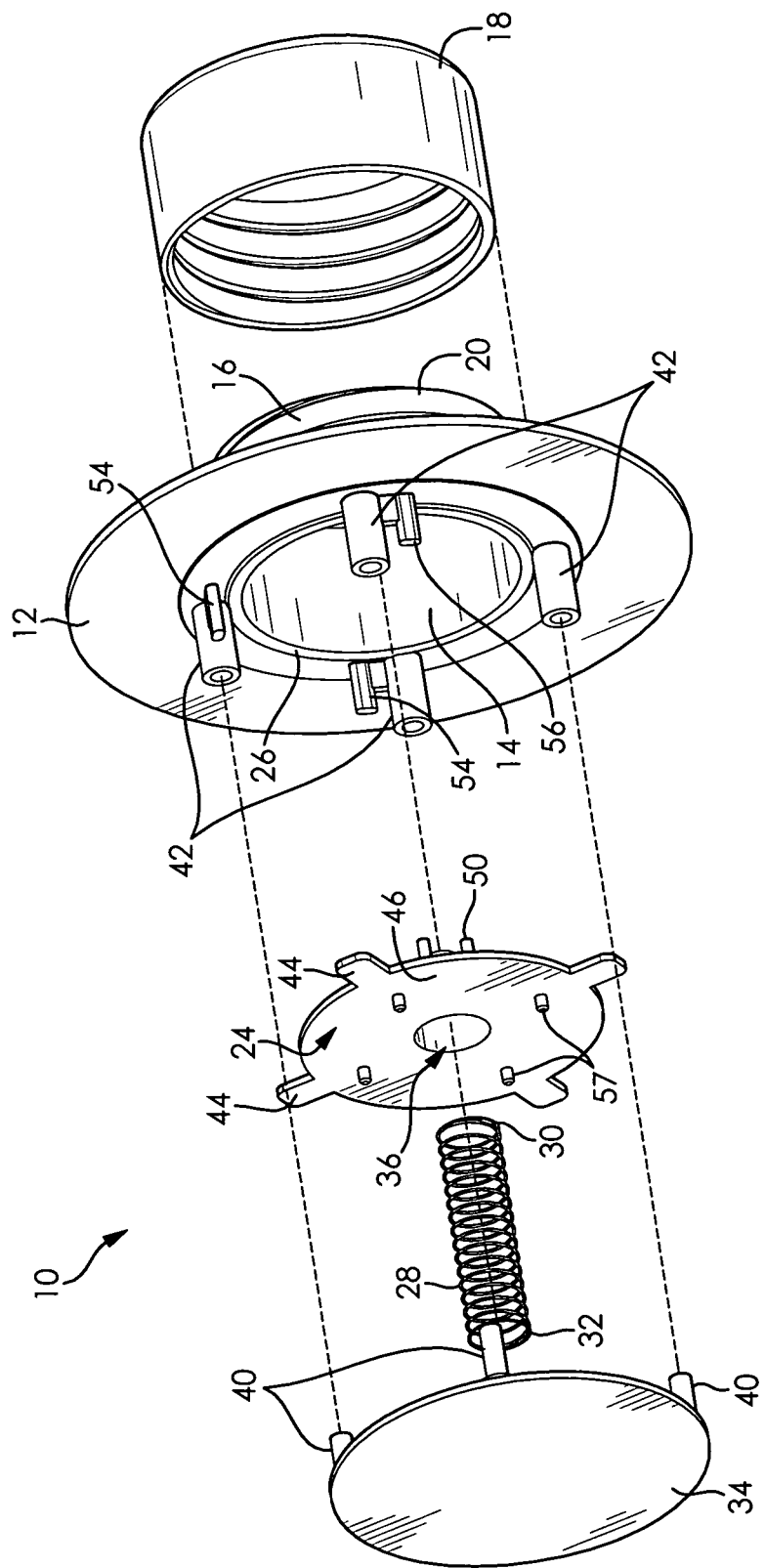
FIG. 4 is a perspective exploded view of a valve according to the first example of the invention from a second angle.
Figure 5:
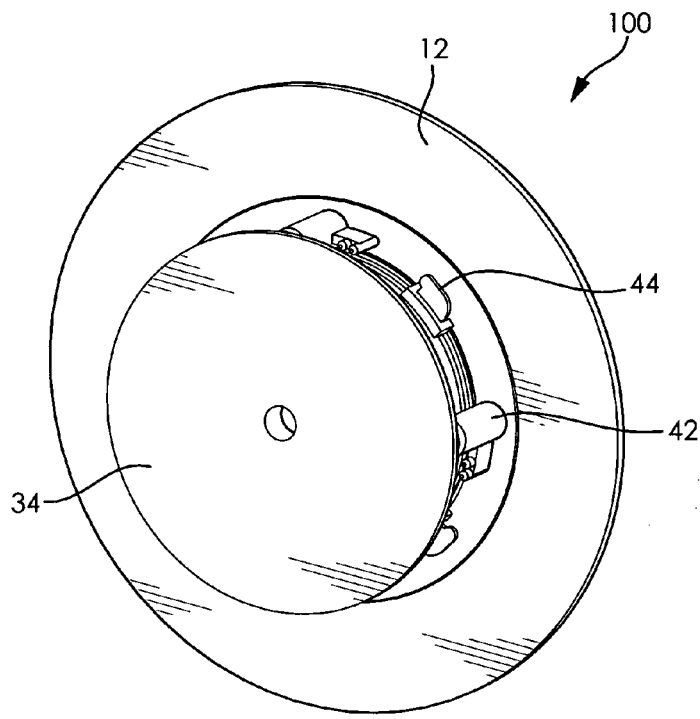
FIG. 5 is a perspective view of a valve according to a second example of the invention with the valve in a closed condition.
Figure 6:
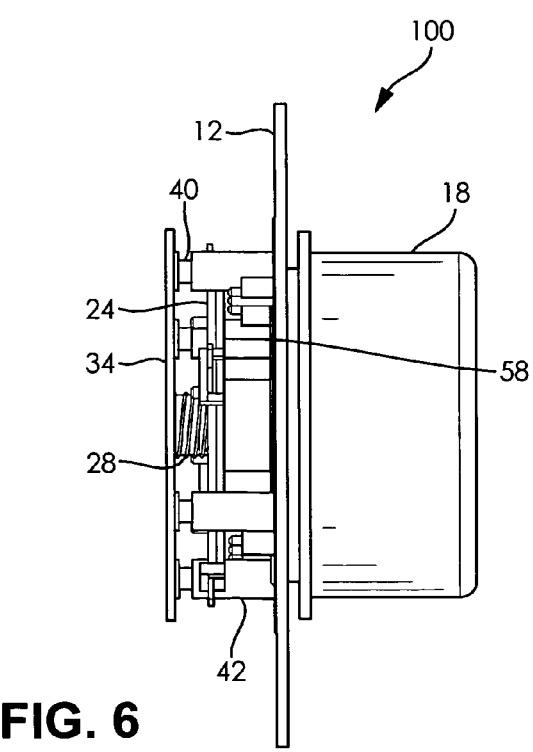
FIG. 6 is a side view of a valve according to the second example of the invention with a valve disk held in an open position against the force of a biasing spring.
Figure 9:
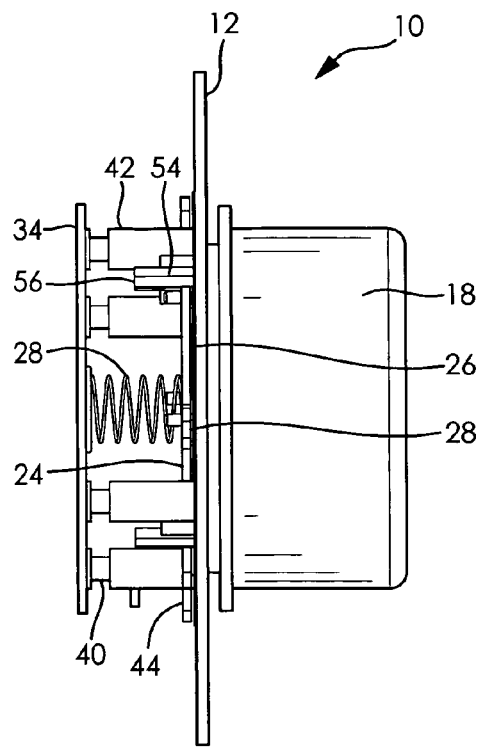
FIG. 9 is a side view of a valve according to the first example of the invention with the valve in a closed condition.
Figure 10:
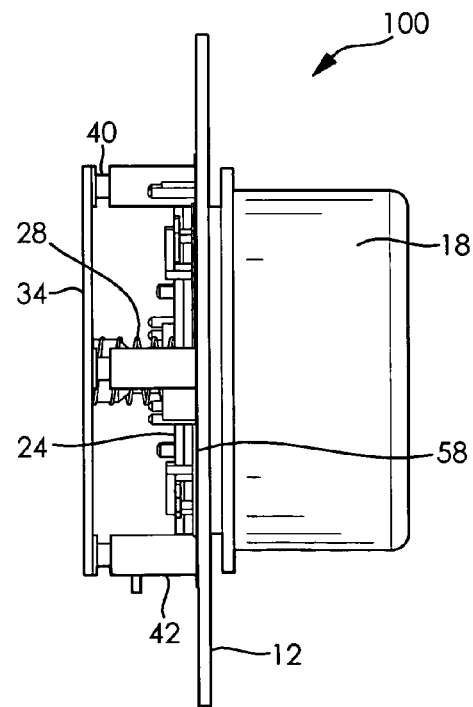
FIG. 10 is a side view of a valve according to the second example of the invention with the valve in a closed condition.

The valve 10 includes a valve disk 24 which is supported in the valve 10 for movement between open positions and a closed position. When the valve disk 24 is in an open position, such as shown in FIG. 2, air can flow freely through the valve 10 and through the air inlet 14. In this position, the valve disk 24 is positioned away from the flange 12 and away from a valve seat 26 (FIG. 4). When the valve disk 24 is in the closed position, as shown in FIG. 9, the valve disk 24 is seated on the valve seat 26 and air flow through the valve 10 and through the air inlet 14 is restricted or prevented.

A spring 28 biases the valve disk 24 towards the closed position, i.e., towards the valve seat 26 and towards the flange 12. A first end 30 of the spring 28 acts on the valve disk 24 and a second end 32 of the spring 28 acts on a spring plate 34, which is supported relative to the flange 12 at a fixed distance from the flange 12. As the valve disk 24 moves from the closed position to an open position, the spring 28 is compressed. Radial movement of the first end 30 of the spring 28, relative to the valve disk 24, is restricted by a recess, indicated at 36, in the valve disk 24. The recess 36 has a diameter that is larger than the diameter of the first end 30 of the spring 28. Radial movement of the second end 32 of the spring 28, relative to the spring plate 34 is restricted by a raised circular boss 38 which has a diameter that is larger than the diameter of the second end 32 of the spring 28.

The spring plate 34 has projections 40 which extend axially from the spring plate 34 towards the flange 12. Projections 42 extend axially from the flange 12 towards the spring plate 34. When the flange 12 and the spring plate 34 are aligned axially, the projections 42 and 40 can be aligned with each other. In the embodiment shown in the drawing Figures, the projections 40 are configured as posts and the projections 42 are configured as cylinders although these configurations can be reversed. It is preferred that the outside diameter of the posts and the inside diameter of the cylinders are controlled so that there is enough frictional engagement between the posts and the cylinders when they are engaged to connect the plate 34 to the flange 12 and to keep them connected. This type of connection eliminates the need for any additional connection between these parts while keeping the flange 12 and the spring plate 34 connected and separated by a given distance, as needed. This type of connection allows one to connect the spring plate 34 to the flange 12 by hand, without the need for tools or adhesives of any kind. However, it will be appreciated that other means for connecting the flange 12 and the spring plate 34 must be considered to be within the scope of the invention, even though they are not preferred.

The valve disk 24 includes tabs 44 which extend radially outwardly from a central, substantially round portion 46 of the valve disk 24. When the spring plate 34 is connected to the flange 12 and the valve disk 24 is axially aligned therewith, the central portion 46 of the valve disk 24 fits within the area defined by the projections 42. The central portion 46 is sized and the projections 42 are positioned so that the valve disk 24 is supported for rotational movement relative to the spring plate 34 and the valve seat 26. When the flange 12 is connected to the spring plate 34, and the valve disk 24 is between them, the valve disk 24 is held captive although it can move axially, to a limited degree and it can rotate. The tabs 44 extend radially outwardly to the extent that they limit rotational movement of the valve disk 24. Specifically, the valve disk 24 can rotate until the tabs 44 contact the projections 42 and, due to this contact, further rotation of the valve disk 24 is prevented. With four projections 42 on the flange 12, relative rotation between the valve disk 24 and the spring plate 34 will be limited to less than ninety degrees. There may be less than four projections 42 in which case the relative rotation will be limited to less than 120 degrees. There may be more than four projections 42 in which case the relative rotation will be limited to less than 72 degrees. Excellent results have been obtained in the case where there are four projections 42. A minimum of three axially extending projections are preferred.

The valve 10 may be assembled in the following manner. The valve disk 24 is positioned against the flange 12 with the tabs 44 positioned between adjacent projections 42. The first end 30 of the spring 28 is inserted into the spring recess 36. The spring plate 34 is moved towards the flange 12. The projections 40 are aligned with corresponding projections 42, the second end 32 of the spring 28 is aligned with the spring retention boss 38, and the plate 34 and the flange 12 are manipulated to bring the projections 40 and 42 into frictional engagement with each other. The parts are configured and sized so that, when the valve 10 is assembled, the spring 28 holds the valve disk 24 against the valve seat 26. Before these assembly steps are carried out, the flange 12 may be secured to a bag around an edge defining an opening in a bag. Alternatively, the valve can be assembled before the flange 12 is secured to a bag.

In order to fill a bag equipped with a valve corresponding with the valve 10, air under pressure is delivered to the air inlet 14. As pressure builds up in the air inlet 14, it acts on the valve disk 24 against the force of the spring 28. When the pressure reaches a threshold, the spring force of the spring 28 is exceeded by the force of the air under pressure acting on the valve disk 24 and it moves towards the spring plate 34. It is preferred that the threshold be comparatively low so that the valve 10 opens when the valve disk 24 sees air at a pressure of less than 90 p.s.i. It is more preferred that the threshold be low enough so that the valve 10 opens when the valve disk 24 sees air at a pressure of less than 70 p.s.i. and, even more preferably, the threshold pressure will be less than 60 p.s.i. With the valve 10 open, air will flow through the air inlet 14 into the bag until the source of pressure is removed from the air inlet 14. At that point, the spring 28 will move the valve disk 24 towards the flange 12 until the valve disk 24 seats on the valve seat 26. This will prevent or restrict the flow of air out of the bag although some air may escape through the valve slowly due to the relatively low spring force of the spring 28. The cap 18 may be secured to the inlet tube 16 to essentially prevent the flow of air out of the bag.

The valve 10 is especially suited for deflating an inflated bag. The valve disk 24 includes a manually operable deflation actuator 48 comprising a plurality of finger engagement tips 50 supported on a raised portion 52 of the valve disk 24. When the valve 10 is assembled, the finger engagement tips 50 extend a substantial distance into the inlet tube 16 towards its distal end 20. By pressing against the tips 50, the force of the spring 28 is easily overcome, even if pressure is applied only by a finger or fingers, and the valve disk 24 will unseat from the valve seat 26 so that air may flow out of the bag through the inlet tube 16. No tool is required to unseat the valve disk so that a bag may be inflated and no tool is required to unseat the valve disk so that a bag may be deflated. This gives the valve of the present invention numerous advantages over known valves adapted for use in inflating and deflating dunnage bags.

When the valve 10 is opened to deflate a bag, it is desirable to have a mechanism for maintaining the valve 10 in the open position during deflation so that attention can be turned to deflating other bags in a load while air escapes from a bag with an open valve. For this purpose, deflation lugs 54 are provided on the flange 12. The lugs 54 extend axially from the flange 12 towards the spring plate 34. Tab surfaces 56 are provided on the deflation lugs 54 and these are spaced from the spring plate 34 when the valve 10 is assembled, as can be seen in FIG. 9. The deflation lugs 54 are positioned so that they are outside of the central portion 46 of the valve disk 24 when the valve is assembled and so that the valve disk tabs 44 will come into contact with the tab surfaces 56 when the valve disk 24 is moved toward the spring plate, rotated and released. Coaction between the valve disk tabs 44 and the tab surfaces 56 in this case will maintain the valve disk 24 in an open position against the force of the spring 28 and this condition is illustrated in FIG. 2. It is preferred that, when the valve disk 24 is moved towards the spring plate 34 and rotated until the tabs 44 come into contact with the projections 42, the tabs 44 will be aligned with tab surfaces so that, when the valve disk 24 is released, the spring 28 will move the disk towards the flange 12 and the tabs 44 will seat on the tab surfaces 56.

When it is desired to close the valve 10, the valve disk 24 is rotated from the position shown in FIG. 2 to a point where the tabs 44 are no longer in contact with the tab surfaces 56. When the tabs 44 are clear of the tab surfaces 56 and the valve disk 24 is released, the spring force of the spring 28 will move the valve disk 24 towards the flange 12 and into contact with the valve seat 26, thereby closing the valve 10. Rotation of the valve disk 24 from the position shown in FIG. 2 can be carried out by manipulating the finger engagement tips 50 on the valve disk 24. Rotation is facilitated if the valve disk 24 is moved towards the spring plate 34 before the valve disk 24 is rotated. In case the valve disk 24 is moved towards and into contact with the spring plate 34 before the valve disk is rotated, low friction bumps 57 can be provided in the valve disk 24 to minimize friction between the valve disk 24 and the plate 34, further facilitating rotation of the valve disk 24.

Referring now to FIGS. 5 through 8 and 10, a second embodiment of a valve according to the invention is indicated at 100. There are substantial similarities between the valve 10 and the valve 100, and there are some significant differences. Like reference numbers are used in these Figures to refer to like parts or substantially like parts shown in FIGS. 1 through 4 and 9 and reference is made to the foregoing description of those parts.

Figure 7:
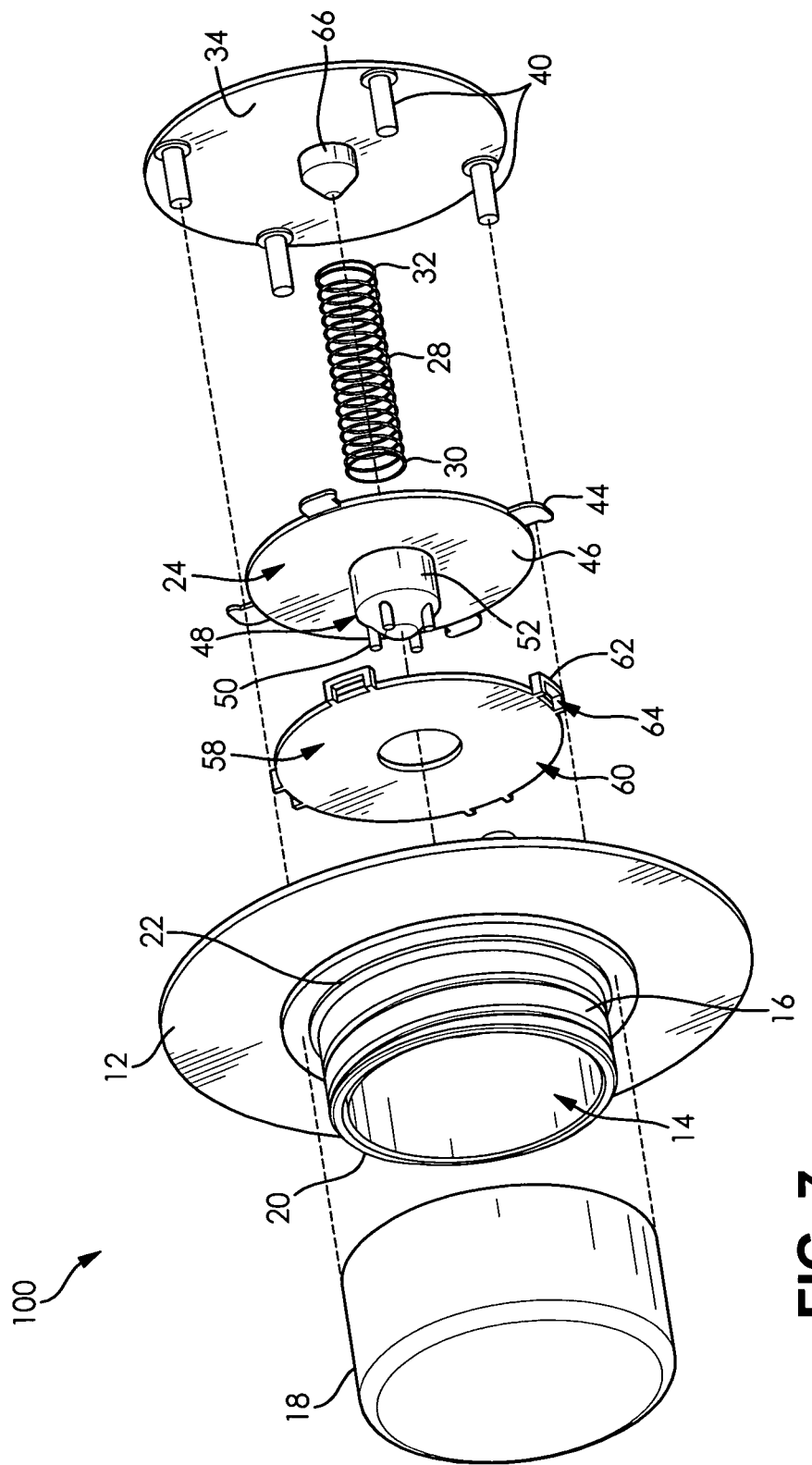
FIG. 7 is a perspective exploded view a valve according to the second example of the invention from a first angle.
Figure 8:
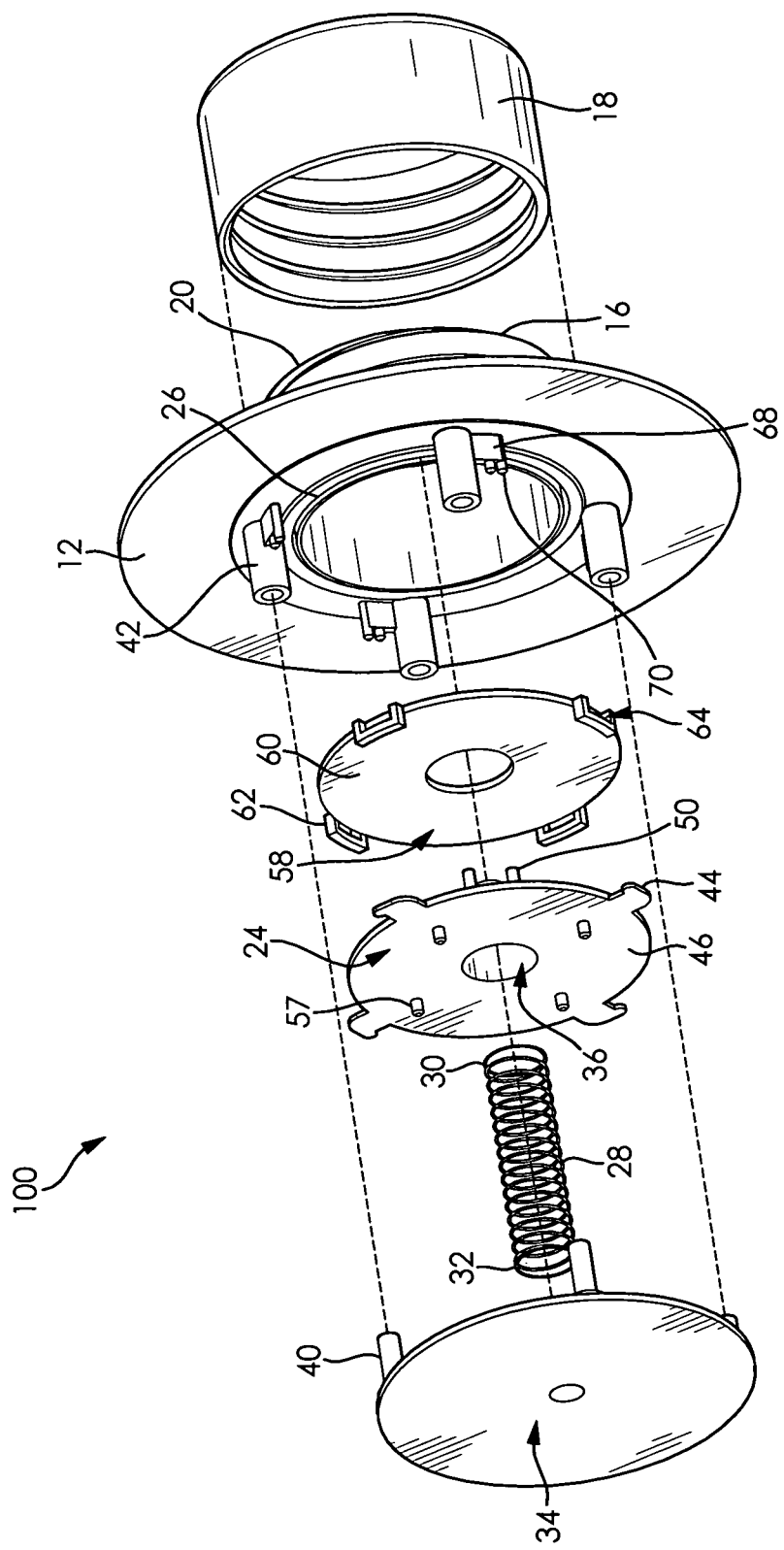
FIG. 8 is a perspective exploded view of a valve according to the second example of the invention from a second angle.

A sealing disk 58 is illustrated in FIGS. 7 and 8. It comprises a central region 60 and loops 62. The central region 60 is substantially co-extensive with the central region 46 of the valve disk 24. The sealing disk 58 is secured to the valve seat side of the valve disk 24 by engagement between the loops 62 and the tabs 44. The loops 62 are pulled over the tabs 44 so that portions of the loops are on the spring plate side of the valve disk 34 and the tabs 44 extend through the loop openings, indicated at 64. It is preferred that the sealing disk 58 be made from a strong, resilient, somewhat soft material such as silicone. This promotes a good seal between the sealing disk 58 and the valve seat and it facilitates the step of connecting the sealing disk 58 to the valve disk 24. The sealing disk 58 can improve the overall sealing properties of the valve 100. In assembling the valve 100, the sealing disk 58 would be connected to the valve disk 24 before the valve disk 24 is assembled in the valve 100.

The spring plate 34 has a raised central portion 66 which serves as a spring locator. The second end 32 of the spring 28 is positioned over the raised portion 66 and this restricts radial movement of the spring 28. The central portion 66 is a more aggressive spring locator than the circular boss 36 on the spring plate 34 in the valve 10.

The flange 12 includes deflation lugs 68 with tab surfaces 70. Each lug 68 has two tab surfaces 70. The profile of the deflation lugs 68 is somewhat smaller than the profiles of the deflation lugs 54 of the valve 10. The smaller profile helps because a portion of each of the tabs 44 is covered by a portion of the corresponding loop 62 leaving a smaller portion of each tab 44 available to engage the corresponding deflation lug 68. This lug configuration helps to prevent contact between portions of the sealing disk 58 and the deflation lugs 68 which might hamper the free movement of the valve disk 24.

The valve disk 24 is supported in the valve 10 and the valve 100 for axial movement between the flange 12 and the spring plate 34 and for rotational movement. However, in this valve, the valve disk 24 floats meaning that it may become skewed so that its axis is not coincident with the axes of the valve seat and the spring. In order to prevent the orientation of the valve disk 24 from becoming too skewed, and interfering with the operation of the valves 10 and 100 and the free movement of the valve disk 24, it is preferred to have the diameter of the central portion 46 of the valve disk 24 be greater than the distance between the valve seat 26 and the spring plate 34. This positively prevents the valve disk 24 from turning sideways, for example, and binding and getting stuck. It is preferred to have the diameter of the central portion 46 of the valve disk 24 be at least twice the distance between the valve seat 26 and the spring plate 34.

It will be appreciated that a valve according to the present invention can be adapted for use in a wide variety of applications. The invention resides in the valves made up of the components described above and in sub combinations of these components which are new: and unobvious. The foregoing description of the preferred embodiments of the invention are presented merely to convey to a person having ordinary skill in the field of valves the various features of the invention, and not to limit the invention to the embodiments described above.

I claim:

1. A valve for selectively sealing and unsealing an opening in a bladder, said valve comprising
    a mounting flange for securing the valve to the bladder around the opening, said mounting flange having an air passageway extending therethrough,
    a valve seat supported on said mounting flange,
    a spring plate connected to said mounting flange and supported so that it is spaced a given distance from said valve seat,
    posts extending between said mounting flange and said spring plate,
    a floating valve disk having a central portion and a plurality of tabs extending outwardly from said central portion, said valve disk being positioned between said spring plate and said valve seat and supported for movement between a closed position where it is adjacent to said valve seat and an open position where it is spaced from said valve seat,
    a spring positioned between said valve disk and said spring plate and operable to bias said valve disk towards said valve seat, and
    deflation lugs extending from said valve seat,
    wherein said floating valve disk is supported for rotational movement between a first position and a second position,
    wherein said floating valve disk tabs engage said deflation lugs when said floating valve disk is in said first rotational position and do not engage said deflation lugs when said floating valve disk is in said second rotational position, and
    wherein, when said deflation lugs engage said floating valve disk tabs, said deflation lugs are operable to support said floating valve disk in the open position against the force of said spring.

2. The valve claimed in claim 1 wherein a diameter of said central portion of said floating valve disk is greater than a distance between said valve seat and said spring plate.

3. The valve claimed in claim 2 wherein the diameter of said central portion of said floating valve disk is at least about twice the distance between said valve seat and said spring plate.

4. The valve claimed in claim 1 wherein said air passageway in said mounting flange is defined by an air inlet tube defining an air passageway and having a distal end and a proximal end, and wherein the air passageway at the distal end of said air inlet tube is larger than the air passageway at the proximal end of said air inlet tube.

5. The valve claimed in claim 1 wherein said spring plate further comprises a spring locator.

6. The valve claimed in claim 1 wherein said floating valve disk further comprises a spring recess.

7. The valve claimed in claim 1 wherein said floating valve disk further comprises a deflection actuator extending towards said mounting flange, said deflection actuator being accessible from outside of the bladder.

8. The valve claimed in claim 1 wherein the pressure of air delivered into the bladder is operable to move the floating valve disk from the closed position towards the open position against the force of said spring.

9. The valve claimed in claim 8 wherein air under a pressure of sixty pounds per square inch is operable to move the floating valve disk from the closed position.

10. The valve claimed in claim 1 further comprising a sealing disk supported on said floating valve disk so that said sealing disk engages said valve seat when said floating valve disk is in the closed position.

11. The valve claimed in claim 10 wherein said sealing disk comprises peripheral loops operable to engage said floating valve disk and to retain said sealing disk on said floating valve disk.

12. The valve claimed in claim 4 further comprising a cap configured for threaded engagement with said distal end of said air inlet tube.

13. A bladder having an opening and a valve for selectively sealing and unsealing the opening, said valve comprising
    a mounting flange having an air passageway extending therethrough, said mounting flange being secured to the bladder so that said air passageway is in communication with the opening in the bladder,
    a valve seat supported on said mounting flange,
    a spring plate connected to said mounting flange and supported so that it is spaced a given distance from said valve seat,
    posts extending between said mounting flange and said spring plate,
    a floating valve disk having a central portion and a plurality of tabs extending outwardly from said central portion, said floating valve disk being positioned between said spring plate and said valve seat and supported for movement between a closed position where it is adjacent to said valve seat and an open position where it is spaced from said valve seat,
    a spring positioned between said floating valve disk and said spring plate and operable to bias said floating valve disk towards said valve seat, and
    deflation lugs extending from said valve seat,
    wherein said floating valve disk is supported for rotational movement between a first position and a second position,
    wherein said floating valve disk tabs engage said deflation lugs when said floating valve disk is in said first rotational position and do not engage said deflation lugs when said floating valve disk is in said second rotational position, and
    wherein, when said deflation lugs engage said floating valve disk tabs, said deflation lugs are operable to support said floating valve disk in the open position against the force of said spring.

14. The bladder claimed in claim 13 wherein said spring plate is operable to prevent the bladder from impeding the flow of air into or out of the opening.

15. The bladder claimed in claim 13 wherein a diameter of said central portion of said floating valve disk is greater than a distance between said valve seat and said spring plate.

16. The bladder claimed in claim 15 wherein the diameter of said central portion of said floating valve disk is at least about twice the distance between said valve seat and said spring plate.

17. The bladder claimed in claim 13 wherein said air passageway in said mounting flange is defined by an air inlet tube defining an air passageway and having a distal end and a proximal end, and wherein the air passageway at the distal end of said air inlet tube is larger than the air passageway at the proximal end of said air inlet tube.

18. The bladder claimed in claim 13 wherein the pressure of air delivered into the bladder is operable to move the floating valve disk from the closed position towards the open position against the force of said spring.

\* \* \* \* \*